United States Patent
Yu et al.

(10) Patent No.: US 12,236,695 B2
(45) Date of Patent: Feb. 25, 2025

(54) SYSTEM AND METHOD WITH MASKING FOR CERTIFIED DEFENSE AGAINST ADVERSARIAL PATCH ATTACKS

(71) Applicant: Robert Bosch GmbH, Stuttgart (DE)

(72) Inventors: Shuhua Yu, Pittsburgh, PA (US); Aniruddha Saha, Elkridge, MD (US); Chaithanya Kumar Mummadi, Pittsburgh, PA (US); Wan-Yi Lin, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 17/949,980

(22) Filed: Sep. 21, 2022

(65) Prior Publication Data
US 2024/0096120 A1    Mar. 21, 2024

(51) Int. Cl.
*G06V 20/00*         (2022.01)
*G06V 10/22*         (2022.01)
(Continued)

(52) U.S. Cl.
CPC ............ *G06V 20/95* (2022.01); *G06V 10/22* (2022.01); *G06V 10/267* (2022.01); *G06V 10/764* (2022.01); *G06V 20/52* (2022.01)

(58) Field of Classification Search
CPC ...... G06V 20/95; G06V 10/22; G06V 10/267; G06V 10/764; G06V 20/52; G06V 10/774; G06V 10/82
See application file for complete search history.

(56) References Cited

U.S. PATENT DOCUMENTS

| | | | |
|---|---|---|---|
| 11,151,417 B2 * | 10/2021 | Laradji | G06N 3/08 |
| 11,967,139 B2 * | 4/2024 | Carmena | G06F 18/214 |
| 2023/0359900 A1 * | 11/2023 | Li | G06V 10/764 |

OTHER PUBLICATIONS

Xiang, Chong, Saeed Mahloujifar, and Prateek Mittal. "{PatchCleanser}: Certifiably robust defense against adversarial patches for any image classifier." arXiv (Aug. 2021). Whole document, Version 1 (Year: 2021).*

(Continued)

*Primary Examiner* — Bobbak Safaipour
*Assistant Examiner* — Joshua Chen
(74) *Attorney, Agent, or Firm* — Kathy Takeguchi; Maginot, Moore & Beck LLP

(57) ABSTRACT

A computer-implemented system and method relate to certified defense against adversarial patch attacks. A set of one-mask images is generated using a first mask at a set of predetermined regions of a source image. The source image is obtained from a sensor. A set of one-mask predictions is generated, via a machine learning system, based on the set of one-mask images. A first one-mask image is extracted from the set of one-mask images. The first one-mask image is associated with a first one-mask prediction that is identified as a minority amongst the set of one-mask predictions. A set of two-mask images is generated by masking the first one-mask image using a set of second masks. The set of second masks include at least a first submask and a second submask in which a dimension of the first submask is less than a dimension of the first mask. A set of two-mask predictions is generated based on the set of two-mask images. Class data, which classifies the source image, is selected based on the set of two-mask predictions.

20 Claims, 11 Drawing Sheets

(51) Int. Cl.
*G06V 10/26* (2022.01)
*G06V 10/764* (2022.01)
*G06V 20/52* (2022.01)

(56) References Cited

OTHER PUBLICATIONS

Xiang et al., "PatchCleanser: Certifiably Robust Defense against Adversarial Patches for Any Image Classifier," arXiv:2108.09135v2, Apr. 8, 2022, pp. 1-22.

* cited by examiner

SET OF SECOND MASKS
700

SUBMASK 1

SUBMASK 2

FIRST MASK
302

SUBMASK 3

SUBMASK 4

SUBMASK 5

SYSTEM AND METHOD WITH MASKING FOR CERTIFIED DEFENSE AGAINST ADVERSARIAL PATCH ATTACKS

GOVERNMENT RIGHTS

At least one or more portions of this invention may have been made with government support under U.S. Government Contract No. 1190060-430433 awarded by Defense Advanced Research Projects Agency (DARPA) in association with its program of Guaranteeing AI Robustness against Deception (GARD). The U.S. Government may therefore have certain rights in this invention.

TECHNICAL FIELD

This disclosure relates generally to machine learning systems, and more particularly to certified defenses against patch attacks.

BACKGROUND

Image classifiers may generate false predictions when small changes, such as perturbations, are applied to the input. For example, adversarial perturbations can either apply to all pixels of an image bounded by a norm constraint so the perturbed image remains visually the same or apply to a small sub-region of the image in which pixel values within this sub-region are changed to an allowable value approximating the addition of a small poster or a small object in a scene. The latter is known as patch attack, which has drawn attention recently for being produced in the physical world without requiring direct access to the input of the classifier. Although PatchCleanser provides a certified defense against such patch attacks, PatchCleanser applies a masking strategy to an image in a manner that loses significant image information and affects classification accuracy.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes obtaining a source image. The method includes generating a set of one-mask images using a first mask at a set of predetermined regions of the source image. The method includes generating, via a machine learning system, a set of one-mask predictions based on the set of one-mask images. The method includes extracting a first one-mask image from the set of one-mask images. The first one-mask image being associated with a first one-mask prediction that is identified as a minority amongst the set of one-mask predictions. The method includes generating a set of two-mask images by masking the first one-mask image using a set of second masks. The set of second masks include at least a first submask and a second submask in which a dimension of the first submask is less than a dimension of the first mask. The method includes generating, via the machine learning system, a set of two-mask predictions based on the set of two-mask images. The method includes selecting class data that classifies the source image based on the set of two-mask predictions.

According to at least one aspect, a system includes a processor and a memory. The memory is in data communication with the processor. The memory has computer readable data including instructions stored thereon that, when executed by the processor, cause the processor to perform a method for defending against adversarial patch attacks. The method includes obtaining a source image. The method includes generating a set of one-mask images using a first mask at a set of predetermined regions of the source image. The method includes generating, via a machine learning system, a set of one-mask predictions based on the set of one-mask images. The method includes extracting a first one-mask image from the set of one-mask images. The first one-mask image being associated with a first one-mask prediction that is identified as a minority amongst the set of one-mask predictions. The method includes generating a set of two-mask images by masking the first one-mask image using a set of second masks. The set of second masks include at least a first submask and a second submask in which a dimension of the first submask is less than a dimension of the first mask. The method includes generating, via the machine learning system, a set of two-mask predictions based on the set of two-mask images. The method includes selecting class data that classifies the source image based on the set of two-mask predictions.

According to at least one aspect, a non-transitory computer readable medium has computer readable data including instructions stored thereon that, when executed by a processor, cause the processor to perform a method for defending against patch attacks. The method includes obtaining a source image. The method includes generating a set of one-mask images using a first mask at a set of predetermined regions of the source image. The method includes generating, via a machine learning system, a set of one-mask predictions based on the set of one-mask images. The method includes extracting a first one-mask image from the set of one-mask images. The first one-mask image being associated with a first one-mask prediction that is identified as a minority amongst the set of one-mask predictions. The method includes generating a set of two-mask images by masking the first one-mask image using a set of second masks. The set of second masks include at least a first submask and a second submask in which a dimension of the first submask is less than a dimension of the first mask. The method includes generating, via the machine learning system, a set of two-mask predictions based on the set of two-mask images. The method includes selecting class data that classifies the source image based on the set of two-mask predictions.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
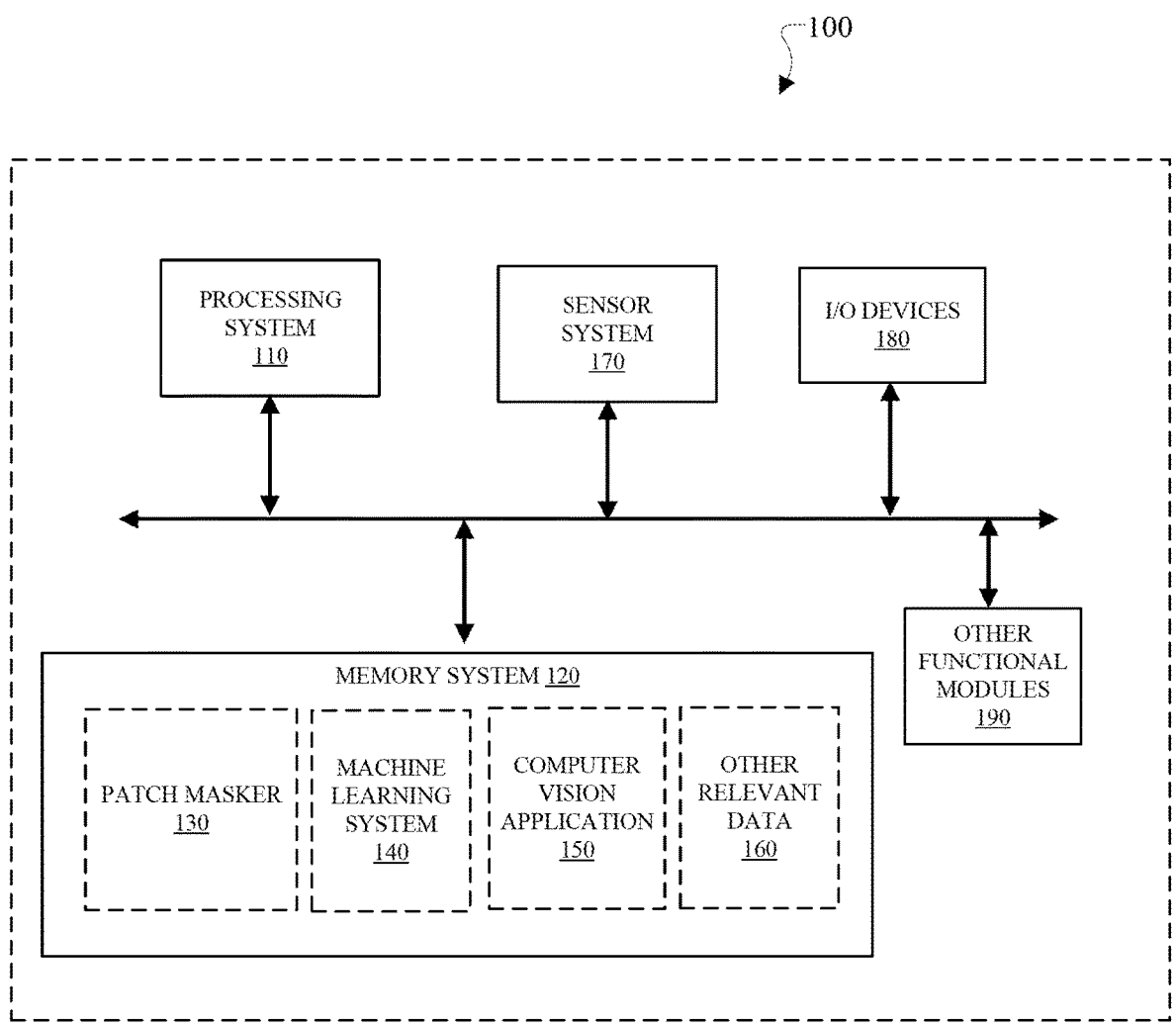
FIG. 1 is a diagram of an example of a system configured to defend against adversarial patch attacks according to an example embodiment of this disclosure.

FIG. 1 is a diagram of a non-limiting example of a system 100, which is configured to defend against adversarial patch attacks. The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a patch masker 130, a machine learning system 140, a computer vision application 150, and other relevant data 160, which are stored thereon. The patch masker 130 includes computer readable data with instructions, which, when executed by the processing system 110, is configured to defend against patch attacks. The computer readable data can include instructions, code, routines, various related data, any software technology, or any number and combination thereof. In an example embodiment, the machine learning system 140 includes at least one artificial neural network model and/or any suitable machine learning model, which is configured to perform a classification task. In this regard, for example, the machine learning system 140 includes a classifier (e.g., a convolutional neural network (CNN), ResNet, vision transformer (ViT), or any suitable classification model). Also, the computer vision application 150 is configured to apply the output (e.g., class data) of the machine learning system 140 to computer vision technology. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor (e.g., microphone), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate digital image data based on the sensor data. In this regard, the processing system 110 is configured to obtain the sensor data as digital image data directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. image data) in connection with the patch masker 130, the machine learning system 140, the computer vision application 150, the other relevant data 160, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology (e.g. wired communication technology, wireless communication technology, or a combination thereof) that enables components of the system 100 to communicate with each other as described herein. In this regard, the system 100 is operable to execute the patch masker 130 to defend against adversarial patch attacks with respect to the machine learning system 140, as described herein.

Figure 2A:
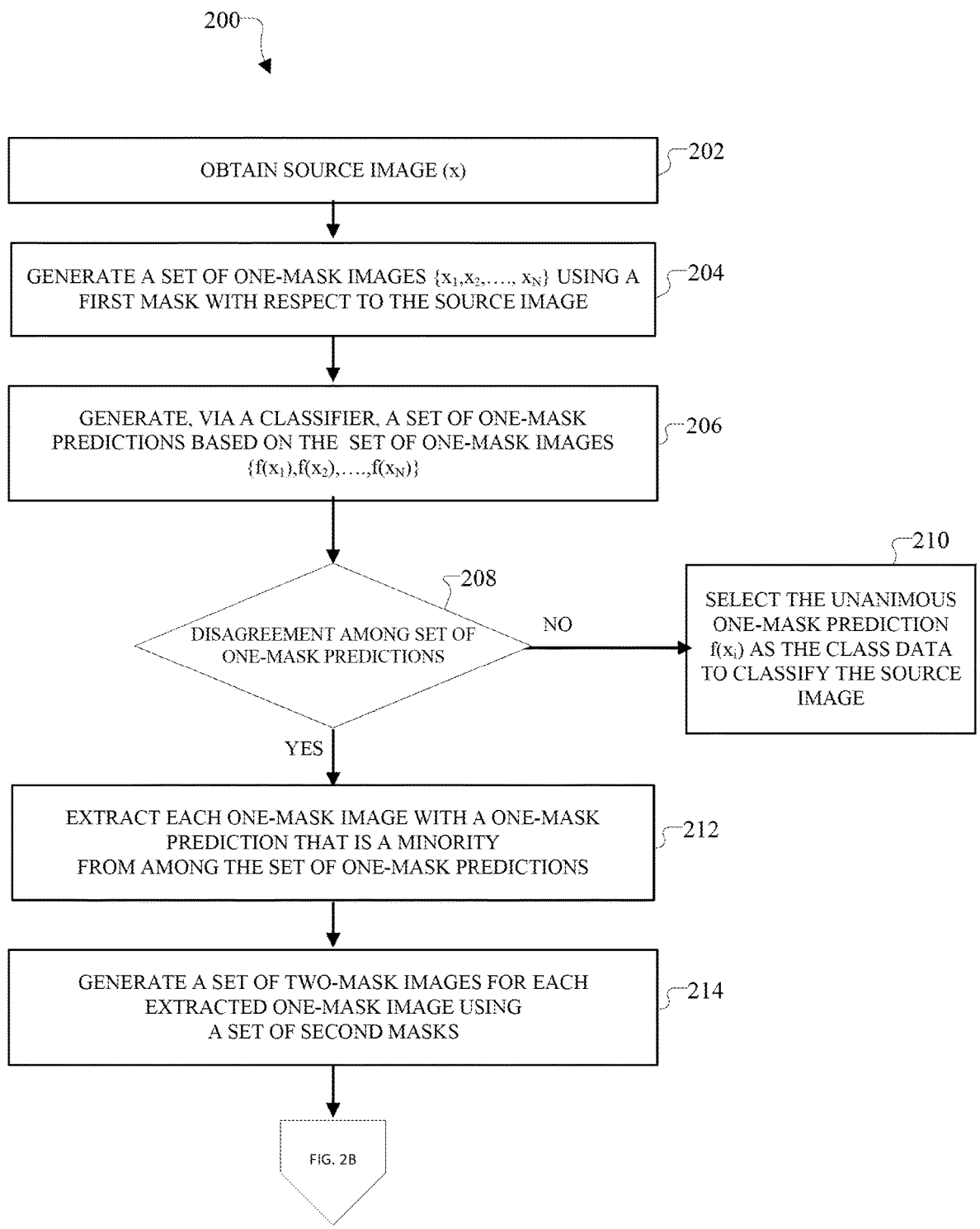
FIG. 2A and FIG. 2B illustrate a flow diagram of a process for defending against adversarial patch attacks according to an example embodiment of this disclosure.
Figure 2B:
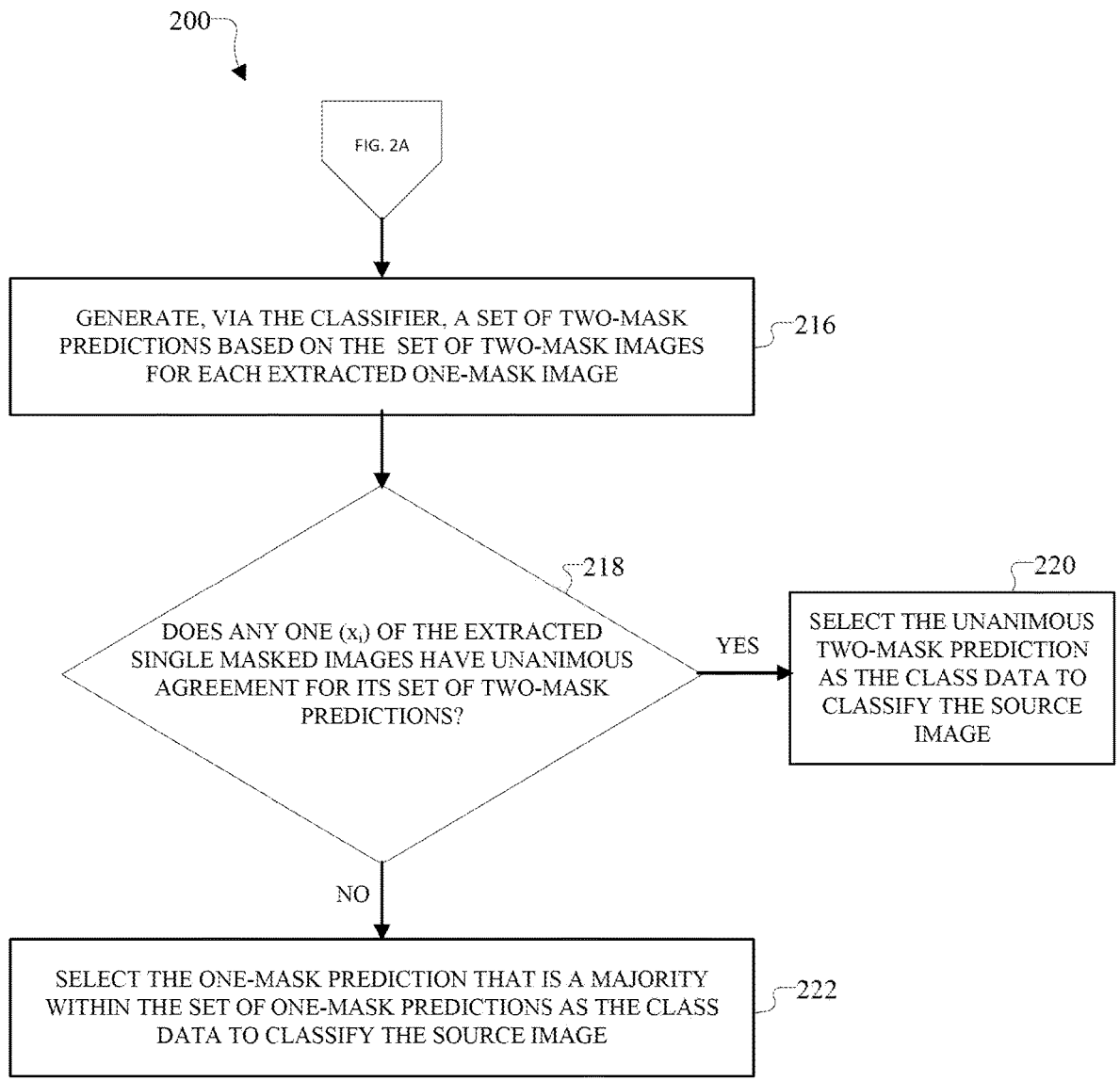

FIG. 2A and FIG. 2B illustrate a flow diagram of a process 200 for defending against adversarial patch attacks according to an example embodiment. The process 200 comprises a computer-implemented method, which is stored in the memory system 120 as the patch defense system 130 and which is executed via one or processors of the processing system 110. The process 200 may include more steps or less steps than those steps discussed with respect to FIG. 2A and FIG. 2B provided that such modifications provide the same functions and/or objectives as the process 200 of FIG. 2A and FIG. 2B.

At step 202, according to an example, the processing system 110 obtains an input image, which may be referred to as the source image 300 (denoted as "x"). The processing system 110 may obtain the source image 300 directly or indirectly from the sensor system 170. The processing system 110 may obtain the source image 300 from the memory system 120. For example, in FIG. 3, the source image 300 is a digital image, which has a height, denoted as "h," and a width, denoted as "w." The source image 300 may be a clean image with no adversarial pixels. Alternatively, the source image 300 may include an adversarial patch, which includes adversarial pixels. In any event, the processing system 110 is configured to defend against an adversarial attack involving an adversarial patch, having a height, denoted as "$h_p$," and a width, denoted as "$w_p$," on the source image 300.

At step 204, according to an example, the processing system 110 generates a set of one-mask images using a first mask 302 with respect to the source image 300. In an example embodiment, the first mask 302 comprises a rectangular shape having a height, denoted as $h_{M1}$, and a width, denoted as $w_{M1}$. In this example, the first mask 302 is sized to cover at most a 3% adversarial patch of a square shape on the source image 300. The first mask 302 serves to mask or block an area of pixels on the source image 300 so that those masked pixels are not visible/available for processing by the machine learning system 140.

Figure 3:
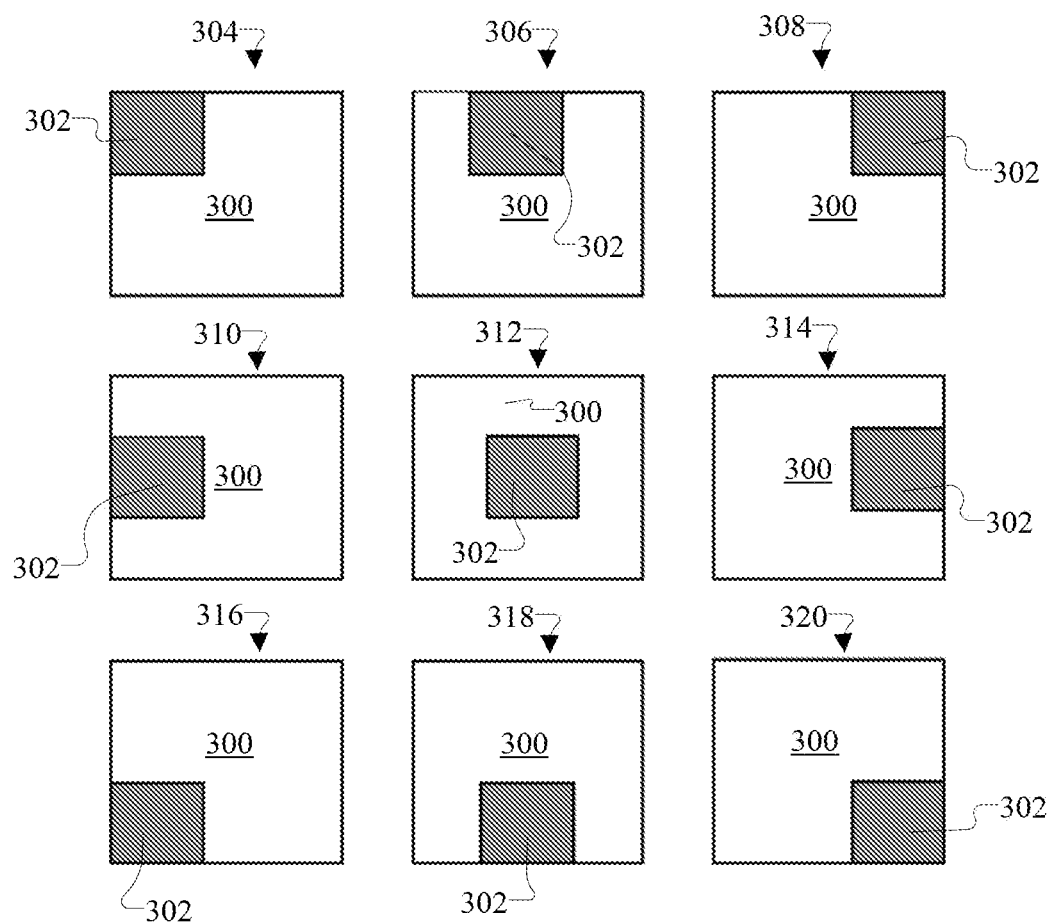
FIG. 3 is a diagram of a non-limiting example of a set of one-mask images according to an example embodiment of this disclosure.

The set of one-mask images may be denoted by $\{x_1, x_2, \ldots, x_N\}$, where N represents an integer value and the total number of one-mask images. The set of one-mask images comprise the first mask 302 at a set of predetermined regions that are identified based on a set of predetermined locations of the source image 300. In an example, each predetermined region is defined with respect to the first mask 302 such that an area of a predetermined region is equal to an area of the first mask 302. The set of predetermined regions collectively cover every pixel of the source image 300. Also, each one-mask image includes the first mask 302 at a single predetermined region within the set of predetermined regions. For instance, as a non-limiting example, FIG. 3 illustrates a set of one-mask images, which include nine different one-mask images using the first mask 302. As shown in FIG. 3, the first mask 302 covers a different predetermined region of the source image 300 in each one-mask image.

At step 206, according to an example, the processing system 110 generates, via the machine learning system 140, a set of one-mask predictions based on the set of one-mask images. More specifically, the processing system 110 provides each one-mask image as input data to the machine learning system 140. In response to a given one-mask image as input data, the machine learning system 140 is configured to generate prediction data, which may be referred to as a one-mask prediction. For example, when the machine learning system 140 is a classifier, the machine learning system 140 is configured to generate class data as the one-mask prediction that classifies the given one-mask image upon receiving that given one-mask image as input data. Upon receiving the set of one-mask images, the machine learning system 140 generates the set of one-mask predictions.

Referring to FIG. 3 as a non-limiting example, the processing system 110 is configured to generate a set of one-mask predictions that include (1) a first one-mask prediction when the machine learning system 140 receives the first one-mask image 304 as input data, (2) a second one-mask prediction when the machine learning system 140 receives the second one-mask image 306 as input data, (3) a third one-mask prediction when the machine learning system 140 receives the third one-mask image 308 as input data, (4) a fourth one-mask prediction when the machine learning system 140 receives the fourth one-mask image 310 as input data, (5) a fifth one-mask prediction when the machine learning system 140 receives the fifth one-mask image 312 as input data, (6) a sixth one-mask prediction when the machine learning system 140 receives the sixth one-mask image 314 as input data, (7) a seventh one-mask prediction when the machine learning system 140 receives the seventh one-mask image 316 as input data, (8) an eighth one-mask prediction when the machine learning system 140 receives the eighth one-mask image 318 as input data, and (9) a ninth one-mask prediction when the machine learning system 140 receives the ninth one-mask image 320 as input data.

At step 208, according to an example, the processing system 110 determines whether or not there is disagreement among the set of one-mask predictions. In this regard, for example, the processing system 110 identifies a disagreement when there is at least one one-mask prediction that is different from the other one-mask predictions. As a non-limiting example, for instance, the processing system 110 may determine that there is disagreement when the machine learning system 140 classifies at least one one-mask image as a "stop sign" while classifying other one-mask images as a "tree." In this regard, this disagreement occurs between at least one one-mask prediction (e.g., stop sign) and at least one other one-mask prediction (e.g., tree). Additionally or alternatively, the processing system 110 determines whether or not there is unanimous agreement among the set of one-mask predictions. As each one-mask image comprises the same source image 300 with the first mask 302 at a different predetermined region of the source image, the processing system 110 determines that the one-mask prediction is valid when each one of the set of one-mask predictions agree with each other (i.e. when they all have the same one-mask prediction). Accordingly, upon determining that all of one-mask predictions within the set of one-mask predictions are the same or in unanimous agreement, then the processing system 110 performs step 210. Alternatively, upon determining that there is disagreement among the set of one-mask predictions, then the processing system 100 performs step 212.

At step 210, according to an example, the processing system 110 outputs the unanimous one-mask prediction $f(x_i)$ as the predication data for the source image 300. As a non-limiting example, for instance, if all of the one-mask predictions for the set of one-mask images are the same (e.g., all class data is tree for the one-mask images), then the processing system 110 selects and outputs any one of the one-mask predictions as the class data to classify the source image 300. The processing system 110 is then enabled to use this class data with respect to the computer vision application 150.

At step 212, according to an example, the processing system 110 extracts each one-mask image with a one-mask prediction that is a minority from among the set of one-mask predictions. As a non-limiting example, for instance, when the machine learning system 140 classifies a single one-mask image as a stop sign and classifies several other one-mask images as a tree, then the processing system 110 determines that the one-mask prediction of "stop sign" is a minority one-mask prediction within the set of one-mask predictions. The processing system 110 also determines that the one-mask prediction of "tree" is a majority one-mask prediction within the set of one-mask predictions when "tree" occurs the most amongst the set of one-mask predictions or constitutes a greatest number of the one-mask predictions amongst the set of one-mask predictions. For instance, if seven one-mask images are classified as "tree," then the one-mask prediction of "tree" is considered to be a majority one-mask prediction for the set of one-mask images (e.g., nine one-mask images). Also, there may be more than one one-mask prediction that may be considered a minority one-mask prediction. The processing system 110 extracts a one-mask image (e.g., the first one-mask image 304), which generated the minority one-mask prediction (e.g., the stop sign), and processes this extracted one-mask image at step 214. If there are more than one one-mask images are identified as generating minority one-mask predictions, then each of these one-mask images are extracted and processed at step 214.

Figure 4:
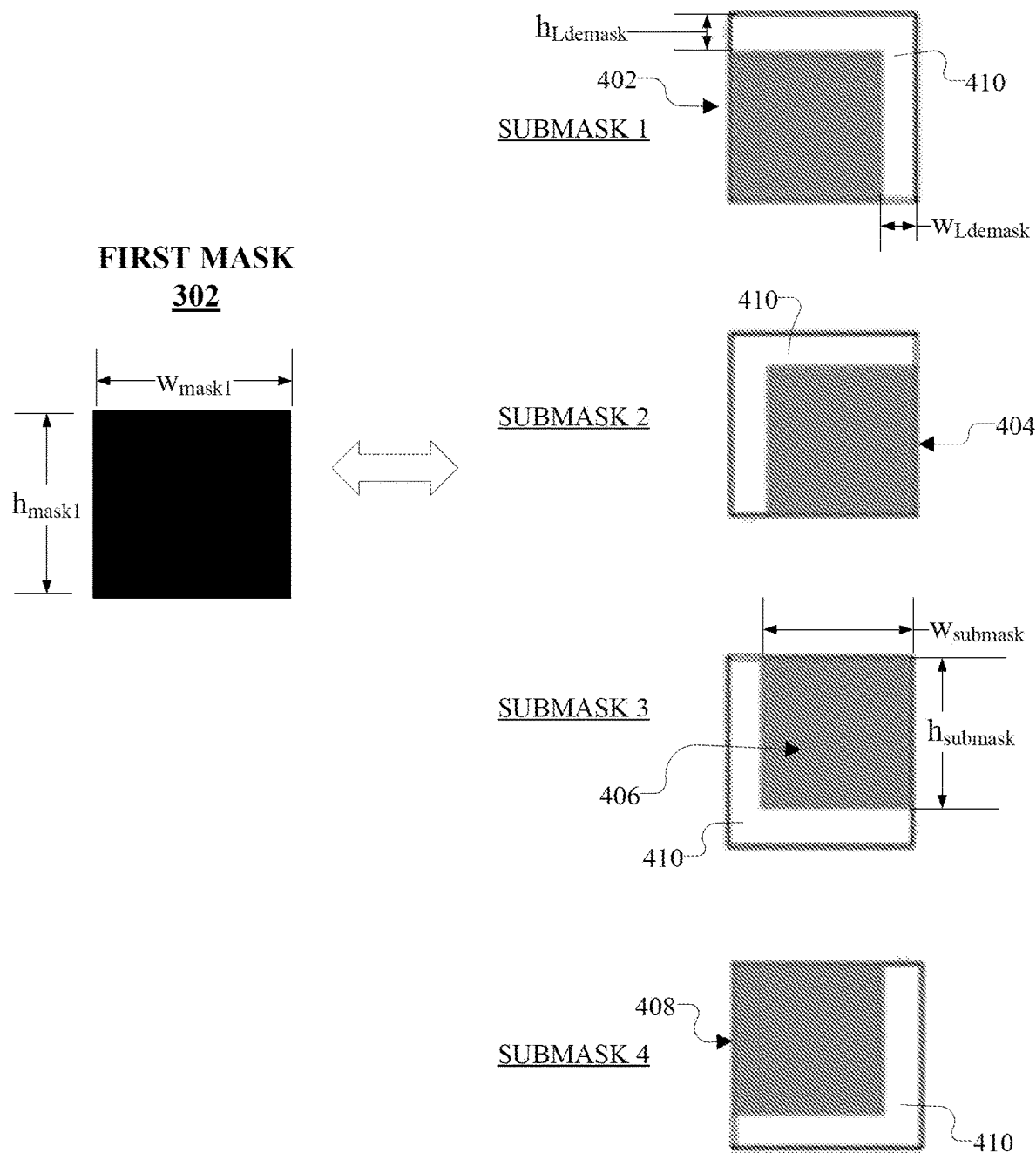
FIG. 4 is a diagram of an example of a first mask and an example of a set of second masks according to an example embodiment of this disclosure.
Figure 5:
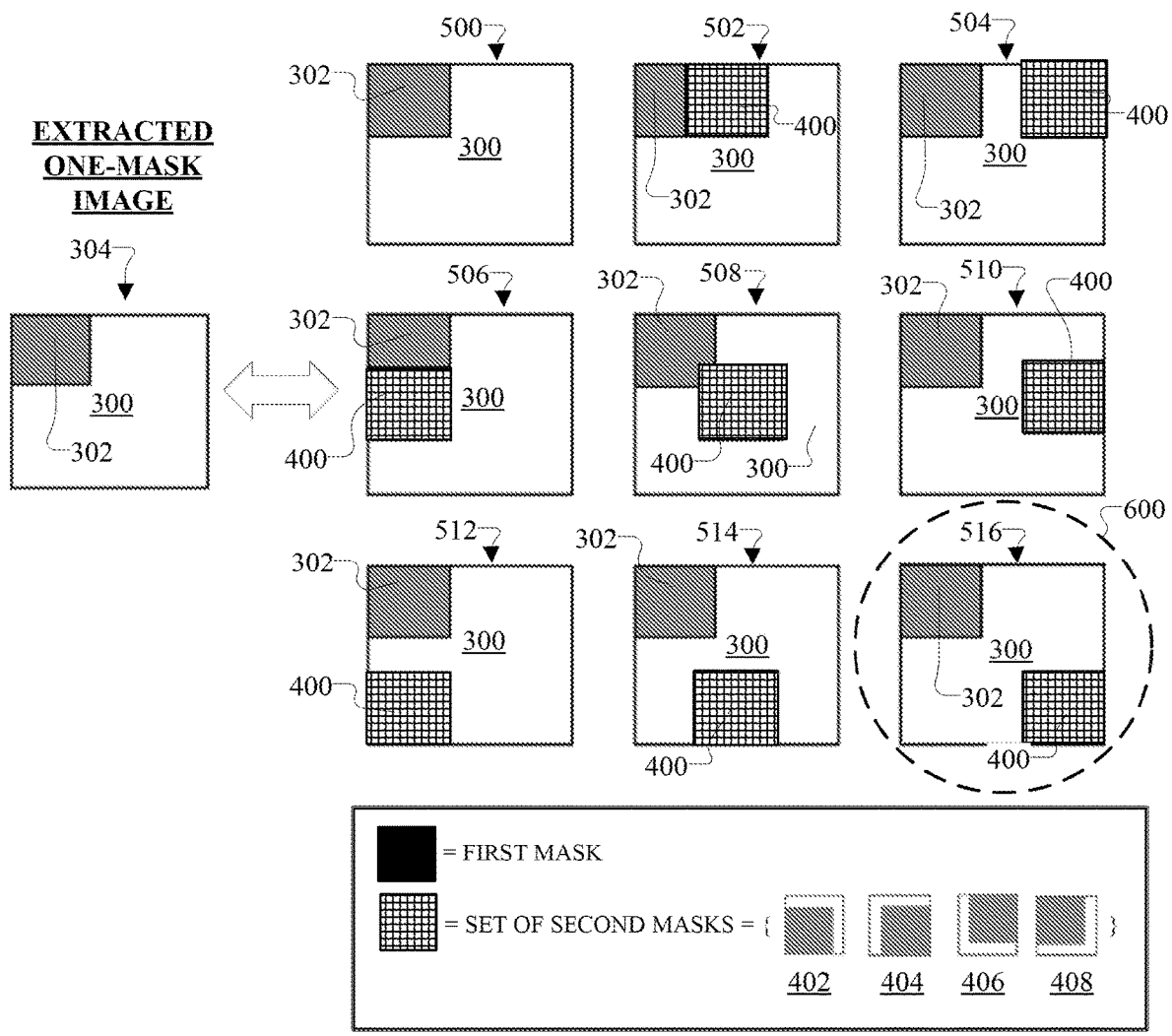
FIG. 5 is a diagram of a non-limiting example of a set of two-mask images according to an example embodiment of this disclosure.

At step 214, according to an example, the processing system 110 generates a set of two-mask images for each extracted one-mask image using a set of second masks 400/700. The set of second masks may include the set of second masks 400 of FIG. 4, the set of second masks 700 of FIG. 7, or the like. Each two-mask image includes (i) the first mask 302 at a fixed location (i.e., one of the predetermined regions) with respect to the source image 300 via the extracted one-mask image and (ii) a submask at one of the predetermined regions within the set of predetermined regions. For instance, FIG. 5 illustrates a non-limiting example of a set of two-mask images. In this case, the set of two-mask images includes thirty-three different two-mask images, which are generated based on the extracted one-mask image (e.g. the first one-mask image 304) using the set of second masks 400 (FIG. 4).

At step 216, according to an example, the processing system 110 generates, via the classifier, a set of two-mask predictions based on the set of two-mask images for each extracted one-mask image. More specifically, the processing system 110 provides each two-mask image as input data to the machine learning system 140. In response to a given two-mask image as input data, the machine learning system 140 is configured to generate prediction data, which may be referred to as a two-mask prediction. For example, when the machine learning system 140 is a classifier, the machine learning system 140 is configured to generate class data as the two-mask prediction that classifies the given two-mask image upon receiving that given two-mask image as input data. Upon receiving the set of two-mask images, the machine learning system 140 generates the set of two-mask predictions. Referring to FIG. 5, as a non-limiting example, the processing system 110 is configured to generate thirty-three two-mask predictions when the machine learning system 140 receives the thirty-three two-mask images as input data.

At step 218, according to an example, the processing system 110 determines whether or not any extracted one-mask image has unanimous agreement for its set of two-mask predictions. Referring to FIG. 5, as an example, for a given extracted one-mask image, the processing system 110 determines whether or not there is unanimous agreement (or any disagreement) among the thirty-three two-mask predictions, which was generated by the machine learning system 140 in response to the thirty-three two-mask images. When there is unanimous agreement among the set of two-mask predictions (e.g., all thirty-three two-mask predictions are the same) for the thirty-three two-mask images, which were based on that extracted one-mask image, the processing system 110 performs step 220. The processing system 110 performs this evaluation for each extracted one-mask image to determine if any extracted one-mask image has unanimous agreement among its set of two-mask predictions. When none of the extracted one-mask images have unanimous agreement among its corresponding set of two-mask predictions, the processing performs step 222.

At step 220, according to an example, the processing system 110 selects the unanimous two-mask prediction as the class data to classify the source image 300. As a non-limiting example, for instance, if all of the two-mask predictions for the set of one-mask predictions are the same (e.g., all classified as stop sign), then the processing system 110 selects and outputs any one of the one-mask predictions (e.g., "stop sign") as the class data to classify the source image 300. The processing system 110 is then enabled to use this class data with respect to the computer vison application 150.

At step 222, according to an example, the processing system 100 selects the one-mask prediction, which is a majority within the set of one-mask predictions, as the class data to classify the source image 300. As a non-limiting example, for instance, upon determining that there is disagreement amongst the set of two-mask predictions, then the processing system 110 selects and outputs a majority one-mask prediction, which has a majority of votes, from among the set of one-mask predictions as the class data to classify the source image 300. For instance, in the aforementioned non-limiting example, the processing system 110 outputs "tree" as the class data for the source image 300 since "tree" is deemed the majority one-mask prediction. That is, the processing system 110 does not select any of the two-mask predictions at least due to the disagreement among them. The processing system 110 is then enabled to use the majority one-mask prediction as the class data with respect to the computer vision application 150.

FIG. 3 is a diagram of a non-limiting example of a set of one-mask images according to an example embodiment. The set of one-mask images includes a first mask 302 at a set of predetermined regions of the source image 300. More specifically, in this example, the set of one-mask images include (1) a first one-mask image 304 that comprises the first mask 302 at a first predetermined region of the source image 300, (2) a second one-mask image 306 that comprises the first mask 302 at a second predetermined region of the source image 300, (3) a third one-mask image 308 that comprises the first mask 302 at a third predetermined region of the source image 300, (4) a fourth one-mask image 310 that comprises the first mask 302 at a fourth predetermined region of the source image 300, (5) a fifth one-mask image 312 that comprises the first mask 302 at a fifth predetermined region of the source image 300, (6) a sixth one-mask image 314 that comprises the first mask 302 at a sixth predetermined region of the source image 300, (7) a seventh one-mask image 316 that comprises the first mask 302 at a seventh predetermined region of the source image 300, (8) an eighth one-mask image 318 that comprises the first mask 302 at an eighth predetermined region of the source image 300, and (9) a ninth one-mask image 320 that comprises the first mask 302 at a ninth predetermined region of the source image 300. As shown in FIG. 3, the first mask 302 is associated with every pixel of the source image 300 collectively across the set of one-mask images via the set of predetermined regions. Accordingly, this set of one-mask images is generated such that at least one of the one-mask images has the first mask 302 covering an adversarial patch if present on the source image 300.

FIG. 4 is a diagram of an example of the first mask 302 in relation to an example of a set of second masks 400 according to an example embodiment. In this case, the set of second masks 400 include a first submask 402, a second submask 404, a third submask 406, and a fourth submask 408. Also, as shown in FIG. 4, each submask is smaller in size (e.g., surface area and dimensions) than the first mask 302. In this regard, FIG. 4 illustrates a boundary of each submask in relation to a boundary of the first mask 302 for comparison. As a non-limiting example, for instance, the first mask comprises 100×100 pixels. In contrast, the first submask 402 covers 70×70 pixels, the second submask 404 covers 70×70 pixels, a third submask 406 covers 70×70 pixels, and a fourth submask 408 covers 70×70 pixels. Also, each submask is configured to cover at most a putative 3% adversarial patch, at most, of a square shape on the source image 300.

Each submask may be generated directly. Alternatively, each submask may be generated by demasking a copy of the first mask 302. The demasking may comprise performing an L-demasking operation on a copy of the first mask 302. In this regard, for example, copies of the first mask 302 may serve as a basis for generating each submask. For example, the first submask 402 is generated by removing an L-shape region 410 from a copy of the first mask 302 at a top, right corner region. The second submask 404 is generated by removing an L-shape region 410 from a copy of the first mask 302 at a top, left corner region. The third submask 406 is generated by removing an L-shape region 410 from a copy of the first mask 302 at a bottom, left corner region. The fourth submask 408 is generated by removing an L-shape region 410 from a copy of the first mask 302 at a bottom, right corner region. The L-shape region 410 comprises the same dimensions and area with respect to each of the submasks of the set of second masks 400, but the L-shape region 410 may be oriented differently (e.g., 90 degree rotation) with respect to each of the submasks of the set of second masks 400.

In the above examples, when generating each submask, the processing system 110 performs at least one demasking operation that satisfies equation 1, equation 2, equation 3, and equation 4. These equations are applied when generating the first submask 402. These equations are applied when generating the second submask 404. These equations are applied when generating the third submask 406. These equations are applied when generating the fourth submask 408. In these equations, $h_{mask1}$ represents a height of the first mask 302, $w_{mask1}$ represents a width of the first mask 302, $h_{Ldemask}$ represents a demasking height, $w_{Ldemask}$ represents a demasking width, $h_p$ represents the height of an adversarial patch, and $w_p$ represents a width of the adversarial patch, as indicated in FIG. 4.

$$h_{Ldemask} = [(h_{mask1} - h_p)/2] \quad [1]$$

$$h_{submask} = h_{mask1} - h_{Ldemask} \quad [2]$$

$$w_{Ldemask} = [(w_{mask1} - w_p)/2] \quad [3]$$

$$w_{submask} = w_{mask1} - w_{Ldemask} \quad [4]$$

As shown in FIG. 4, the first mask 302 provides a greater masking area than any submask from the set of second masks 400. Also, a combined masking area of the first mask 302 and any submask is less than a combined masking area of the first mask 302 and another first mask 302 on the source image 300. In this regard, by using a submask, the patch masker 130 is enabled to provide the machine learning system 140 with more pixels and thus more discriminative image features to classify a two-mask image such that classification accuracy is improved.

FIG. 5 is a diagram of a non-limiting example of a set of two-mask images according to an example embodiment. In this case, the set of two-mask images is generated based on the extracted one-mask image 304, which in this non-limiting example is determined to generate a one-mask prediction that has a minority of votes from among the set of one-mask predictions. More specifically, FIG. 5 includes (1) a first representation 500 that represents a $1^{st}$ two-mask image that comprises the first one-mask image 304 in which the first mask 302 occludes the subset of second masks 400 at the first predetermined region, (2) a second representation 502 that represents a subset of two-mask images ($2^{nd}$, $3^{rd}$, $4^{th}$, and $5^{th}$ two-mask images) with the subset of second masks 400 at the second predetermined region of the extracted one-mask image 304, (3) a third representation 504 that represents a subset of two-mask images ($6^{th}$, $7^{th}$, $8^{th}$, and $9^{th}$ two-mask images) with the subset of second masks 400 at the third predetermined region of the extracted one-mask image 304, (4) a fourth representation 506 that represents a subset of two-mask images ($10^{th}$, $11^{th}$, $12^{th}$, and $13^{th}$ two-mask images) with the subset of second masks 400 at the fourth predetermined region of the extracted one-mask image 304, (5) a fifth representation 508 that represents a subset of two-mask images ($14^{th}$, $15^{th}$, $16^{th}$, and $17^{th}$ two-mask images) with the subset of second masks 400 at the fifth predetermined region of the extracted one-mask image 304, (6) a sixth representation 510 that represents a subset of two-mask images ($18^{th}$, $19^{th}$, $20^{th}$, and $21^{st}$ two-mask images) with the subset of second masks 400 at the sixth predetermined region of the extracted one-mask image 304, (7) a seventh representation 512 that represents a subset of two-mask images ($22^{nd}$, $23^{rd}$, $24^{th}$, and $25^{th}$ two-mask images) with the subset of second masks 400 at the seventh predetermined region of the extracted one-mask image, (8) an eighth representation 514 that represents a subset of two-mask images ($26^{th}$, $27^{th}$, $28^{th}$, and $29^{th}$ two-mask images) with the subset of second masks 400 at the eighth predetermined region of the extracted one-mask image, and (9) a ninth representation 516 that represents a subset of two-mask images ($30^{th}$, $31^{st}$, $32^{nd}$, and $33^{rd}$ two-mask images) with the subset of second masks 400 at the ninth predetermined region of the extracted one-mask image. As shown in FIG. 5, the set of second masks 400 is associated with every pixel of the source image 300 (or the extracted one-mask image) via the set of predetermined regions when taken collectively across the set of two-mask images.

Figure 6:
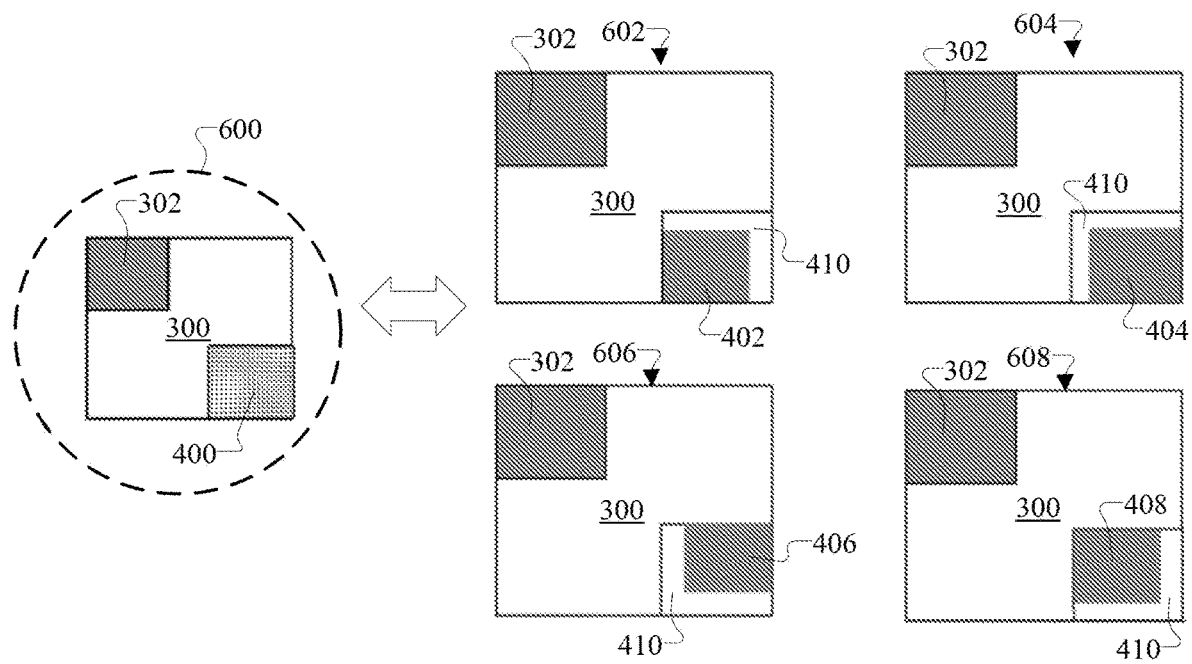
FIG. 6 is a diagram of a non-limiting example of a subset taken from the set of two-mask images according to an example embodiment of this disclosure.
Figure 6:
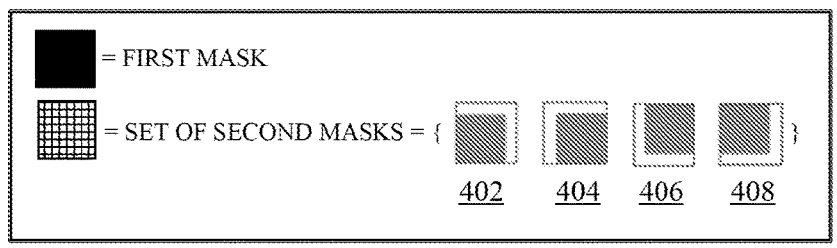

FIG. 6 is a diagram of a non-limiting example of a subset taken from the set of two-mask images according to an example embodiment. More specifically, FIG. 6 illustrates a selected example 600 of a subset of two-mask images. In this case, for discussion purposes, the ninth representation 516 is randomly chosen to show each two-mask image within its subset of two-mask images. As shown in FIG. 5 and FIG. 6, this selected example 600 includes a subset of two-mask images in which the first mask 302 is fixed at the first predetermined region of the source image 300 and the set of second masks 400 are located at the ninth predetermined region of the source image 300 (or the ninth predetermined region of the extracted $1^{st}$ one-mask image). More specifically, this subset of two-mask images include (1) a two-mask image 602 that comprises a first submask 402 at the ninth predetermined region of the extracted one-mask image, which includes the first mask 302 at the first predetermined region, (2) a two-mask image 604 that comprises a second submask 404 at the ninth predetermined region of the extracted one-mask image, which includes the first mask 302 at the first predetermined region, (3) a two-mask image 606 that comprises a third submask 406 at the ninth predetermined region of the extracted one-mask image, which includes the first mask 302 at the first predetermined region, and (4) a two-mask image 608 that comprises a fourth submask 408 at the ninth predetermined region of the extracted one-mask image, which includes the first mask 302 at the first predetermined region.

In addition, FIG. 6 shows a boundary of a predetermined region to illustrate the creation of a masked region and one or more unmasked regions when a given submask is applied that predetermined region. More specifically, for example, FIG. 6 shows that the ninth predetermined region includes an unmasked region corresponding to the L-shaped region 410. Each unasked region exposes pixels of the source image 300. The unmasked region is disposed between an edge of the source image 300 and an edge of any one of the submasks via the L-shape region 410. In this example, a size of a predetermined region is associated with a size (and/or boundary) of the first mask 302. As such, the processing system 110 generates some two-mask images, which reveal image features at edge portions and/or corner portions of the source image 300 and which contribute to improved classification accuracy.

Figure 7:
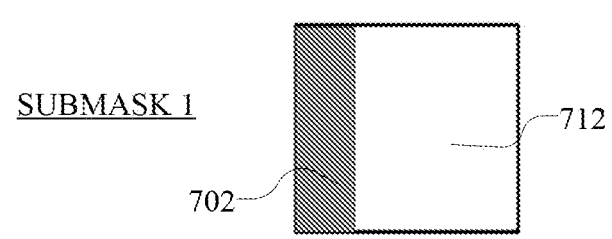
FIG. 7 is a diagram of another example of a first mask and another example of a set of second masks according to an example embodiment of this disclosure.
Figure 7:
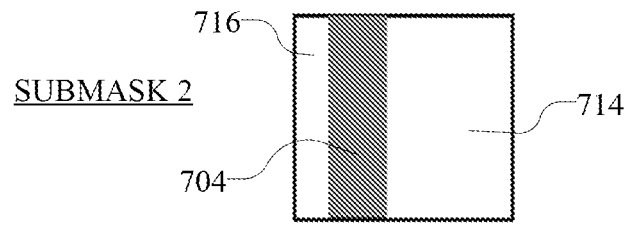
Figure 7:
Figure 7:
Figure 7:
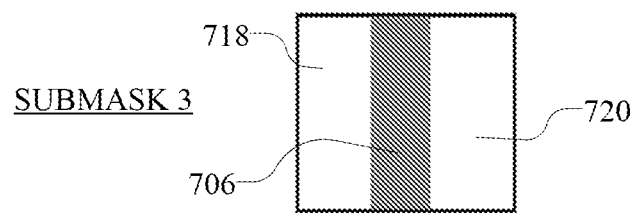
Figure 7:
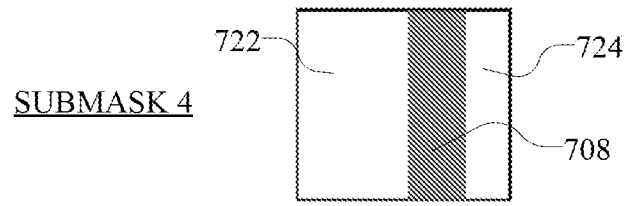
Figure 7:
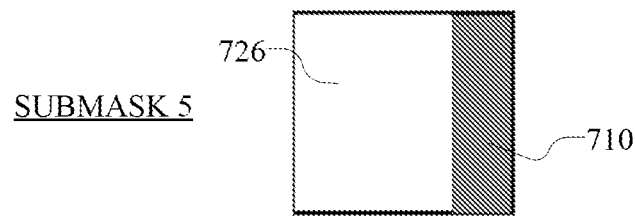

FIG. 7 is a diagram of an example of the first mask 302 in relation to another example of a set of second masks 700 according to an example embodiment. In this case, the set of second masks 700 include a first submask 702, a second submask 704, a third submask 706, a fourth submask 708, and a fifth submask 710. In this regard, the processing system 110 generates a greater number of two-mask images when applying the set of second masks 700 to the extracted one-mask image than when applying the set of second masks 400 to the extracted one-mask image. The set of second masks 700 are configured such that at least one submask is configured to mask an adversarial patch, which occupies 1% of the area of the source image 300, when applied across the set of predetermined regions. Also, as shown in FIG. 7, this set of second masks 700 collectively provide a sliding mask effect across a surface area that is equivalent or similar to the masking area of the first mask 302. In this regard, each submask is structured as a vertical masking strip. Alternatively, each submask may be structured as a horizontal masking strip. In addition, this set of second masks 400 is also configured such that each submask is smaller in size (e.g., surface area, height dimension, width dimension, etc.) than the first mask.

Each submask may be generated directly. Alternatively, each submask may be generated by demasking a copy of the first mask 302. In this regard, for example, the first mask 302 may serve as a basis for generating each submask. For example, the first submask 702 is generated by demasking of a copy of the first mask 302, whereby a rectangular region 712 is removed from the copy of the first mask 302 such that the first submask 702 comprises a rectangular masking strip from a remaining portion of the first mask 302. The second submask 704 is generated by demasking of a copy of the first mask 302, whereby a first rectangular region 714 and a second rectangular region 716 are removed from the copy of the first mask 302 such that the second submask 704 comprises a rectangular masking strip between the first rectangular region 714 and the second rectangular region 716. The third submask 706 is generated by demasking of a copy of the first mask 302, whereby a first rectangular region 718 and a second rectangular region 720 are removed from the copy of the first mask 302 such that the third submask 706 comprises a masking strip between rectangular regions 718 and 720. The fourth submask 708 is generated by demasking of a copy the first mask 302, whereby a first rectangular region 722 and a second rectangular region 724 are removed from the copy of the first mask 302 such that the fourth submask 708 comprises a masking strip between rectangular regions 722 and 724. The fifth submask 710 is generated by demasking of a copy of the first mask 302, whereby rectangular region 726 is removed from the copy of the first mask 302 such that the fifth submask 710 comprises a rectangular masking strip from a remaining portion of the first mask 302.

Also, as shown in FIG. 7, the first mask 302 provides a greater masking area than any one of the submasks of the set of the second masks 700. As a non-limiting example, for instance, a submask from this set of second masks 700 is 40% of the size of the first mask 302. In this regard, FIG. 7 illustrates each submask in relation to a boundary of the first mask 302 for comparison. Also, a combined masking area of the first mask 302 and any one of the submasks of the set of the second masks 700 is less than a combined masking area of the first mask 302 and another first mask 302 on the source image 300. In this regard, the patch masker 130 is enabled to provide the machine learning system 140 with more pixels and thus more discriminative image features to classify a two-mask image, thereby improving classification accuracy.

Figure 8:
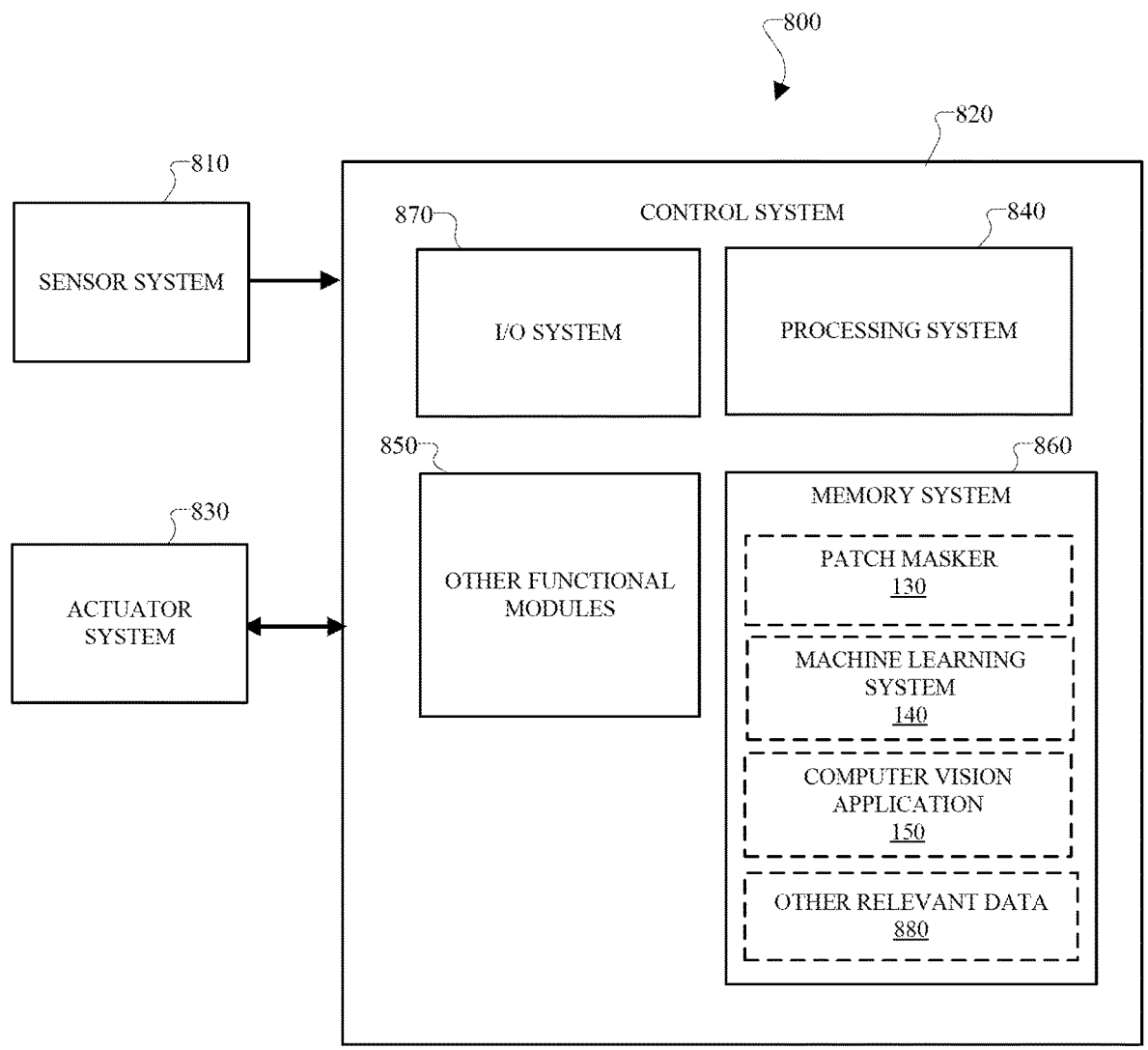
FIG. 8 is a diagram of an example of a system that includes at least a patch masker and a machine learning system according to an example embodiment of this disclosure.

FIG. 8 is a diagram of a system 800, which includes the patch masker 130. The system 800 is configured to also include at least a sensor system 810, a control system 820, and an actuator system 830. The system 800 is configured such that the control system 820 controls the actuator system 830 based on sensor data from the sensor system 810. More specifically, the sensor system 810 includes one or more sensors and/or corresponding devices to generate sensor data. For example, the sensor system 810 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 810 is operable to communicate with the control system 820 via an input/output (I/O) system 870 and/or other functional modules 850, which includes communication technology.

The control system 820 is configured to obtain the sensor data directly or indirectly from one or more sensors of the sensor system 810. In this regard, the sensor data may include sensor data from a single sensor or sensor-fusion data from a plurality of sensors. Upon receiving input, which includes at least sensor data, the control system 820 is operable to process the sensor data via the processing system 840. In this regard, the processing system 840 includes at least one processor. For example, the processing system 840 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 840 is configured to extract, generate, and/or obtain proper input data (e.g., digital image data) for the patch masker 130. In addition, the processing system 840 is operable to generate output data (e.g., class data) via the patch masker 130 and the machine learning system 140 based on communications with the memory system 860. In addition, the processing system 840 is operable to provide actuator control data to the actuator system 830 based on the output data (e.g., class data), which is generated via the patch masker 130 and the machine learning system 140.

The memory system 860 is a computer or electronic storage system, which is configured to store and provide access to various data to enable at least the operations and functionality, as disclosed herein. The memory system 860 comprises a single device or a plurality of devices. The memory system 860 includes electrical, electronic, magnetic, optical, semiconductor, electromagnetic, any suitable memory technology, or any combination thereof. For instance, the memory system 860 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 820 and/or processing system 840, the memory system 860 is local, remote, or a combination thereof (e.g., partly local and partly remote). For example, the memory system 860 may include at least a cloud-based storage system (e.g., cloud-based database system), which is remote from the processing system 840 and/or other components of the control system 820.

The memory system 860 includes at least the patch masker 130, which is executed via the processing system 840. The patch masker 130 is configured to receive or obtain input data, which includes at least one digital image. In this regard, the patch masker 130, via the machine learning system 140 and the processing system 840, is configured to generate output data (e.g., class data) based on the input data (e.g., source image).

Furthermore, as shown in FIG. 8, the system 800 includes other components that contribute to operation of the control system 820 in relation to the sensor system 810 and the actuator system 830. For example, as shown in FIG. 8, the memory system 860 is also configured to store other relevant data 880, which relates to the operation of the system 800 in relation to one or more components (e.g., sensor system 810, the actuator system 830, etc.). Also, as shown in FIG. 8, the control system 820 includes the I/O system 870, which includes one or more interfaces for one or more I/O devices that relate to the system 800. For example, the I/O system 870 provides at least one interface to the sensor system 810 and at least one interface to the actuator system 830. Also, the control system 820 is configured to provide other functional modules 850, such as any appropriate hardware technology, software technology, or any combination thereof that assist with and/or contribute to the functioning of the system 800. For example, the other functional modules 850 include an operating system and communication technology that enables components of the system 800 to communicate with each other as described herein. With at least the configuration discussed in the example of FIG. 8, the system 800 is applicable in various technologies.

Figure 9:
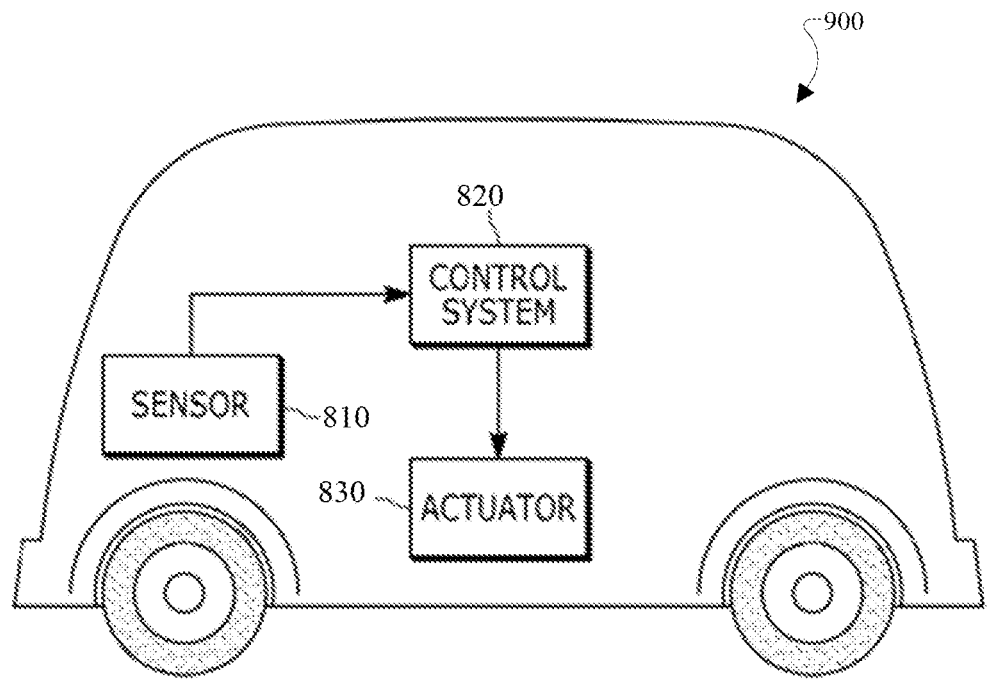
FIG. 9 is a diagram of the system of FIG. 8 with respect to mobile machine technology according to an example embodiment of this disclosure.

FIG. 9 is a diagram of the system 800 with respect to mobile machine technology 900 according to an example embodiment. As a non-limiting example, the mobile machine technology 900 includes at least a partially autonomous vehicle or robot. In FIG. 9, the mobile machine technology 900 is at least a partially autonomous vehicle, which includes a sensor system 810. The sensor system 810 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 810 is configured to provide sensor data to the control system 820.

The control system 820 is configured to obtain image data, which is based on sensor data or sensor-fusion data from the sensor system 810. In addition, the control system 820 is configured to pre-process the sensor data to provide input data of a suitable form (e.g., digital image data) to the patch masker 130. In this regard, the patch masker 130 is advantageously configured to provide one-mask images and two-mask images to the machine learning system 140. In this regard, the patch masker 130 is advantageously configured provide a certified defense against patch attacks when the machine learning system 140 generates class data for a given digital image.

Upon receiving class data from the patch masker 130, the control system 820 is configured to generate actuator control data based on the class data, which classifies a digital image and/or classifies a target object in the digital image. By using class data that is provided by the patch masker 130 (and the machine learning system 140), the control system 820 is configured to generate actuator control data that allows for safer and more accurate control of the actuator system 830 of the vehicle as the patch masker 130 defends against adversarial patch attacks. The actuator system 830 may include a braking system, a propulsion system, an engine, a drivetrain, a steering system, or any number and combination of actuators of the vehicle. The actuator system 830 is configured to control the vehicle so that the vehicle follows rules of the roads and avoids collisions based at least on the class data that is provided by the patch masker 130 (and the machine learning system 140).

Figure 10:
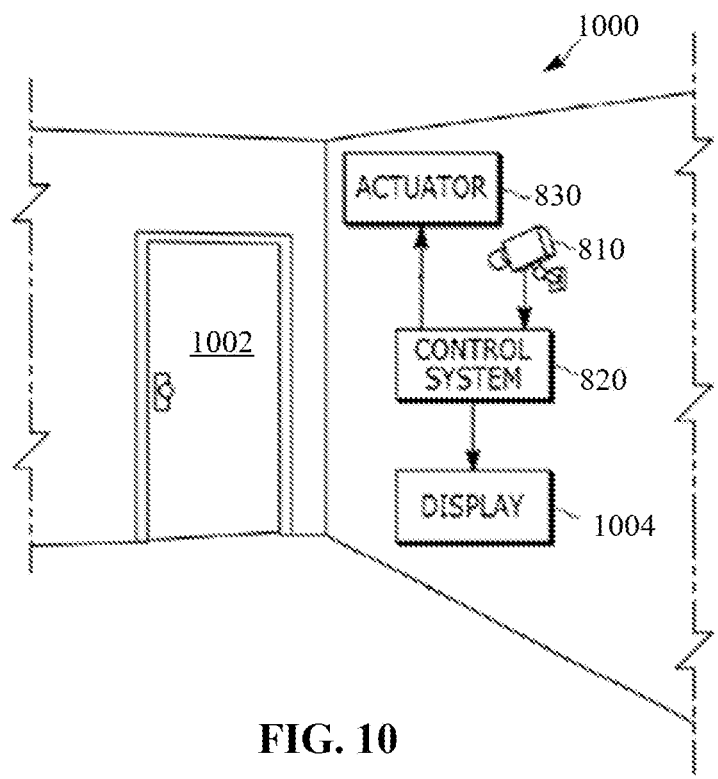
FIG. 10 is a diagram of the system of FIG. 8 with respect to security technology according to an example embodiment of this disclosure.

FIG. 10 is a diagram of the system 800 with respect to security technology 1000 according to an example embodiment. As a non-limiting example, the security technology 1000 includes at least a monitoring system, a control access system, a surveillance system, or any suitable type of security apparatus. For instance, as one example, FIG. 10 relates to security technology 1000, which is configured to physically control a locked state and an unlocked state of a lock of the door 1002 and display an enhanced image/video on the display 1004. The sensor system 810 includes at least an image sensor that is configured to provide image/video data.

The control system 820 is configured to obtain the image/video data from the sensor system 810. The control system 820 is also configured to generate class data that classifies digital images via the patch masker 130 and the machine learning system 140. In this regard, the patch masker 130 and the machine learning system 140 are configured to generate class data, which is at least based on one-mask images and two-mask images. In addition, the control system 820 is configured to generate actuator control data that allows for safer and more accurate control of the actuator system 830 by using class data, which is generated by the patch masker 130 and the machine learning system 140. The control system 820 is configured to display the source image, the class data of the machine learning system 140, any data relating to the patch masker 130 and/or the machine learning system 140, any data relating to the computer vision application 150, or any number and combination thereof on the display 1004.

Figure 11:
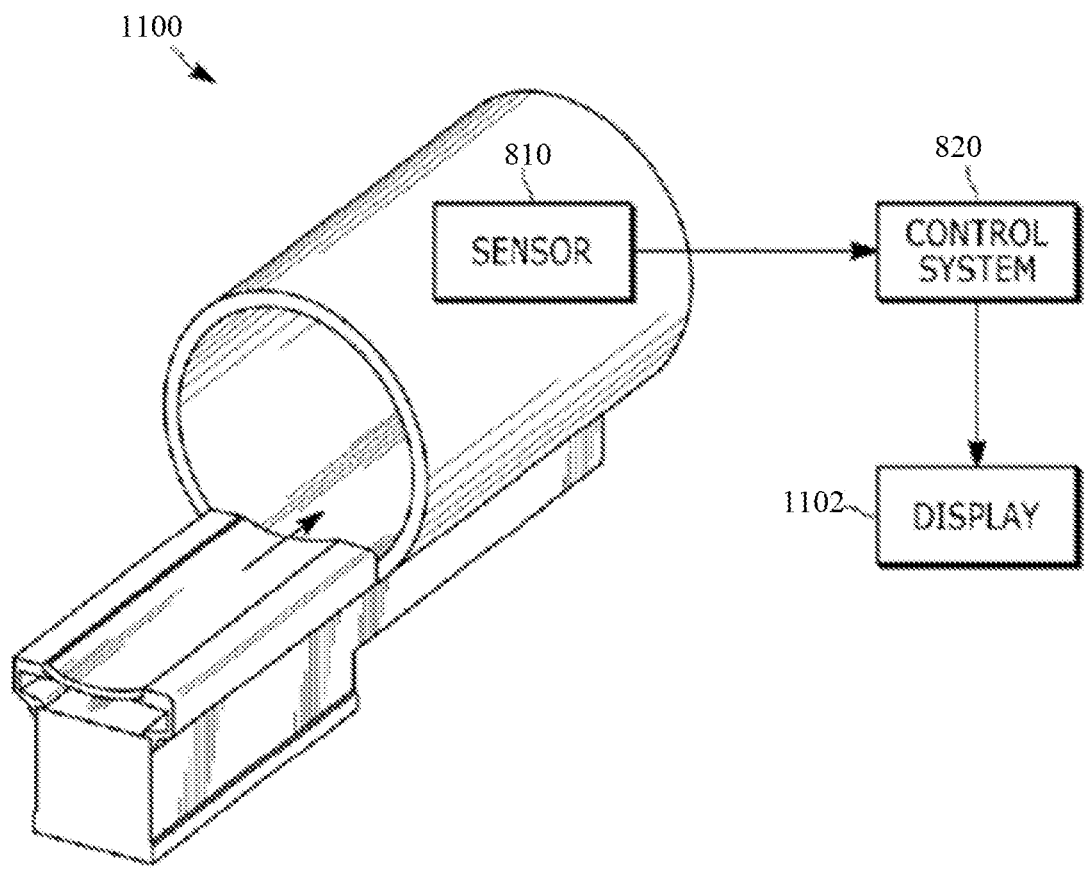
FIG. 11 is a diagram of the system of FIG. 8 with respect to imaging technology according to an example embodiment of this disclosure.

FIG. 11 is a diagram of the system 800 with respect to imaging technology 1100 according to an example embodiment. As a non-limiting example, the imaging technology 1100 includes a magnetic resonance imaging (MRI) apparatus, an x-ray imaging apparatus, an ultrasonic apparatus, a medical imaging apparatus, or any suitable type of imaging apparatus. In FIG. 11, the sensor system 810 includes at least one imaging sensor. The control system 820 is configured to obtain image data from the sensor system 810. The control system 820 is also configured to generate class data that classifies the image data via the patch masker 130 and the machine learning system 140. In addition, the control system 820 is configured to provide more accurate medical information by using the class data, which is generated via the patch masker 130 and the machine learning system 140. In addition, the control system 820 is configured to display the any relevant data (e.g., any data relating to the patch masker 130, the machine learning system 140, the computer vision application 150, or any number and combination thereof) on the display 1102.

As described in this disclosure, the embodiments provide several advantages and benefits. For example, the embodiments include a two-masking technique that reduces the amount of pixels that mask a digital image, thereby providing more pixels (and more image features) for a classifier to perform a classification task and thereby improving classification accuracy. The embodiments also leverage a certification process that requires greater agreement among the two-mask predictions and improves the robustness of the certified defense. The embodiments are advantageous in being able to certify digital images that have unanimous agreement among the two-mask predictions while not certifying digital images that do not have unanimous agreement. The embodiments certify digital images against patch proportions of at most 3% adversarial pixels. The embodiments are advantageous in providing a guaranteed lower bound of robust accuracy and improved certified robustness.

In addition, the embodiments provide a number of improvements over PatchCleanser. For example, the embodiments provide a certified defense with a set of two-mask images in which the amount of pixels that are masked in each two-mask image is reduced compared to PatchCleanser, thereby achieving better classification accuracy compared to PatchCleanser. In this regard, the embodiments provide a certified defense while revealing a greater amount of image content that might contain discriminative image features of an object compared to the amount of image content that is revealed by PatchCleaner. More specifically, for instance, with respect to a 224×224 image for certifying at most a 3% adversarial patch (or a 39×39 adversarial patch), the embodiments provide a combined masking area that is 29.69% of the digital image while PatchCleanser provides a combined masking area that is 39.85% of the digital image. Also, the embodiments require agreement or a unanimous vote over at least thirty-three or more while PatchCleanser requires agreement or a unanimous vote over nine, thereby providing improved certified robustness compared to PatchCleanser. Also, the embodiments are able to provide the machine learning system 140 with at least four times more variations of two-mask images than PatchCleanser. Overall, the embodiments are advantageous in defending against adversarial patch attacks with improved certified robustness and classification accuracy.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for defending against adversarial patch attacks, the method comprising:
   receiving a source image obtained from a sensor;
   generating a set of one-mask images using a first mask at a set of predetermined regions of the source image;
   generating, via a machine learning system, a set of one-mask predictions based on the set of one-mask images;
   extracting a first one-mask image from the set of one-mask images, the first one-mask image being associated with a first one-mask prediction that is identified as a minority amongst the set of one-mask predictions;
   generating a set of two-mask images by masking the first one-mask image using a set of second masks at the set of predetermined regions, the set of second masks including at least a first submask and a second submask in which a dimension of the first submask is less than a dimension of the first mask;
   generating, via the machine learning system, a set of two-mask predictions based on the set of two-mask images; and
   selecting class data that classifies the source image based on the set of two-mask predictions.

2. The computer-implemented method of claim 1, wherein:

the first mask covers a first area of the source image;
the first submask covers a second area of the source image; and
the second area is smaller than the first area.

3. The computer-implemented method of claim 2, wherein the first submask is a version of the first mask in which an L-shaped masking region has been removed from the first mask.

4. The computer-implemented method of claim 1, wherein the set of two-mask images is greater in number than the set of one-mask images.

5. The computer-implemented method of claim 1, wherein:
the set of predetermined regions include a corner region on the source image, the corner region being defined by two converging edges of the source image;
the first submask is spaced from at least one of the two converging edges when the first submask is located at the corner region; and
the first mask is not spaced from the two converging edges when the first mask is located at the corner region.

6. The computer-implemented method of claim 1, wherein the first submask is configured to mask an adversarial patch that covers at most 3% of a total area of the source image.

7. The computer-implemented method of claim 1, further comprising:
determining whether or not there is unanimous agreement amongst the set of two-mask predictions;
selecting a first two-mask predication as the class data to classify the source image when the set of two-mask predictions has the unanimous agreement; and
selecting a second one-mask prediction as the class data to classify the source image when the set of two-mask predictions does not have the unanimous agreement, the second one-mask prediction being identified as a majority amongst the set of one-mask predictions.

8. A system comprising:
a sensor;
a processor;
a memory in data communication with the processor, the memory having computer readable data including instructions stored thereon that, when executed by the processor, cause the processor to perform a method for defending against adversarial patch attacks, the method including:
receiving a source image obtained from the sensor;
generating a set of one-mask images using a first mask at a set of predetermined regions of the source image;
generating, via a machine learning system, a set of one-mask predictions based on the set of one-mask images;
extracting a first one-mask image from the set of one-mask images, the first one-mask image being associated with a first one-mask prediction that is identified as a minority amongst the set of one-mask predictions;
generating a set of two-mask images by masking the first one-mask image using a set of second masks at the set of predetermined regions, the set of second masks including at least a first submask and a second submask in which a dimension of the first submask is less than a dimension of the first mask;
generating, via the machine learning system, a set of two-mask predictions based on the set of two-mask images; and
selecting class data that classifies the source image based on the set of two-mask predictions.

9. The system of claim 8, wherein:
the first mask covers a first area of the source image;
the first submask covers a second area of the source image; and
the second area is smaller than the first area.

10. The system of claim 9, wherein the first submask is a version of the first mask in which an L-shaped masking region has been removed from the first mask.

11. The system of claim 8, wherein the set of two-mask images is greater in number than the set of one-mask images.

12. The system of claim 8, wherein:
the set of predetermined regions include a corner region on the source image, the corner region being defined by two converging edges of the source image;
the first submask is spaced from at least one of the two converging edges when the first submask is located at the corner region; and
the first mask is not spaced from the two converging edges when the first mask is located at the corner region.

13. The system of claim 8, wherein the first submask is configured to mask an adversarial patch that covers at most 3% of a total area of the source image.

14. The system of claim 8, wherein: further comprising:
determining whether or not there is unanimous agreement amongst the set of two-mask predictions;
selecting a first two-mask predication as the class data to classify the source image when the set of two-mask predictions has the unanimous agreement; and
selecting a second one-mask prediction as the class data to classify the source image when the set of two-mask predictions does not have the unanimous agreement, the second one-mask prediction being identified as a majority amongst the set of one-mask predictions.

15. A non-transitory computer readable medium having computer readable data including instructions stored thereon that, when executed by a processor, cause the processor to perform a method for defending against patch attacks, the method including:
receiving a source image obtained from a sensor;
generating a set of one-mask images using a first mask at a set of predetermined regions of the source image;
generating, via a machine learning system, a set of one-mask predictions based on the set of one-mask images;
extracting a first one-mask image from the set of one-mask images, the first one-mask image being associated with a first one-mask prediction that is identified as a minority amongst the set of one-mask predictions;
generating a set of two-mask images by masking the first one-mask image using a set of second masks at the set of predetermined regions, the set of second masks including at least a first submask and a second submask in which a dimension of the first submask is less than a dimension of the first mask;
generating, via the machine learning system, a set of two-mask predictions based on the set of two-mask images; and
selecting class data that classifies the source image based on the set of two-mask predictions.

16. The non-transitory computer readable medium of claim 15, wherein:
the first mask covers a first area of the source image;
the first submask covers a second area of the source image; and
the second area is smaller than the first area.

17. The non-transitory computer readable medium of claim 16, wherein the first submask is a version of the first mask in which an L-shaped masking region has been removed from the first mask.

18. The non-transitory computer readable medium of claim 15, wherein the set of two-mask images is greater in number than the set of one-mask images.

19. The non-transitory computer readable medium of claim 15, wherein:
- the set of predetermined regions include a corner region on the source image, the corner region being defined by two converging edges of the source image;
- the first submask is spaced from at least one of the two converging edges when the first submask is located at the corner region; and
- the first mask is not spaced from the two converging edges when the first mask is located at the corner region.

20. The non-transitory computer readable medium of claim 15, wherein the first submask is configured to mask an adversarial patch that covers at most 3% of a total area of the source image.

\* \* \* \* \*